(12) United States Patent
Huang

(10) Patent No.: US 12,297,799 B2
(45) Date of Patent: May 13, 2025

(54) BASIC MECHANISM FOR CONVERTING FLUID ENERGY INTO MECHANICAL ENERGY

(71) Applicants: Shizheng Huang, Urumqi (CN); Wei Huang, Urumqi (CN)

(72) Inventor: Shizheng Huang, Urumqi (CN)

(73) Assignees: Shizheng Huang, Urumqi (CN); Wei Huang, Urumqi (CN)

( * ) Notice: Subject to any disclaimer, the term of this patent is extended or adjusted under 35 U.S.C. 154(b) by 0 days.

(21) Appl. No.: 18/489,161

(22) Filed: Oct. 18, 2023

(65) Prior Publication Data

US 2024/0068439 A1 Feb. 29, 2024

Related U.S. Application Data

(63) Continuation of application No. PCT/CN2022/114747, filed on Aug. 25, 2022.

(30) Foreign Application Priority Data

Aug. 26, 2021 (CN) .......................... 202110990236.4

(51) Int. Cl.
*F03D 1/06* (2006.01)
*F03B 3/14* (2006.01)
*F03D 3/00* (2006.01)
*F03D 3/06* (2006.01)
*F03D 15/00* (2016.01)

(52) U.S. Cl.
CPC .............. *F03D 1/0633* (2013.01); *F03B 3/14* (2013.01); *F03D 3/002* (2013.01); *F03D 3/062* (2013.01); *F03D 15/00* (2016.05)

(58) Field of Classification Search
None
See application file for complete search history.

(56) References Cited

U.S. PATENT DOCUMENTS

| | | | |
|---|---|---|---|
| 5,462,145 A | 10/1995 | Gimmler | |
| 7,284,949 B2 * | 10/2007 | Haworth | ................. F03D 80/70 416/17 |
| 8,459,949 B2 * | 6/2013 | Lee | ......................... F03D 3/068 416/41 |
| 2015/0211485 A1 | 7/2015 | Tortorello | |

FOREIGN PATENT DOCUMENTS

| | | | | |
|---|---|---|---|---|
| CN | 112469895 A | 3/2021 | | |
| WO | WO-2011065720 A2 * | 6/2011 | ............. | F03D 3/068 |
| WO | 2020110133 A1 | 6/2020 | | |
| WO | 2021009460 A1 | 1/2021 | | |

* cited by examiner

*Primary Examiner* — Juan G Flores
(74) *Attorney, Agent, or Firm* — JEEN IP LAW, LLC

(57) ABSTRACT

A basic mechanism for converting fluid energy into mechanical energy is provided. A blade index plate, fluted disc hold-down devices, a rolling pressing wheel, bevel gears, a fluted disc, a gear, bearings and a stepping self-locking motor are disposed in a hub. First shaft passing holes annularly and uniformly distributed around the hub are formed in a penetrating manner in an annular steel belt. One end of a blade shaft extending out from a root end of each blade is fixedly connected with a blade seat, and the other end of the blade shaft extending out of a head end of each blade is assembled with the annular steel belt. The annular steel belt is correspondingly connected with and penetrated through the blade shaft. The head end of the blade is fixedly provided with a blade baffle plate.

5 Claims, 10 Drawing Sheets

BASIC MECHANISM FOR CONVERTING FLUID ENERGY INTO MECHANICAL ENERGY

CROSS-REFERENCE TO RELATED APPLICATIONS

The present application is a U.S. continuation of co-pending International Patent Application No. PCT/CN2022/114747 filed Aug. 25, 2022, which claims foreign priority of Chinese Patent Application No. 202110990236.4, filed on Aug. 26, 2021 in the State Intellectual Property Office of China, the contents of all of which are hereby incorporated by reference.

TECHNICAL FIELD

The present disclosure relates to hydraulic power and wind power equipment, and in particular to a basic mechanism for converting fluid energy into mechanical energy.

BACKGROUND

There are many kinds of equipment to convert wind energy and water energy into mechanical energy, and the conversion is all achieved by pushing blades with certain installation angles relative to a rotating surface of a turbine by using the wind power and water power. That is, the wind and running water directly push the blade to generate rotation power. Only three-blade fans achieve secondary conversion. That is, the blades rotate through being blown by wind, and then, a rotating velocity of the blades is enabled to be higher than the wind velocity, and the wind is cut, so that wing type blades generate lift force, and a turbine peripheral thrust is formed. Therefore, a value $\lambda$ of a ratio of a blade tip velocity to the wind velocity is a concerned factor of the three-blade fans. However, for the wind energy utilization efficiency of the three-blade fans, an expert Baez gave an ultimate wind energy utilization coefficient $CP(\beta,\lambda)$ being 0.593. From a practical view of the existing wind energy utilization efficiency of the three-blade fans, the value does not exceed 0.474 under the best condition, the value is generally below 0.42, and it is difficult to reach 0.5, let alone 0.593. The key point shall be the general design operation concept of the turbine and the blade parameter selection. Although we want great swept areas and long blades (long force arm), the wind energy in spaces between the blades escapes. It is proved from the conversion efficiency of power conversion machinery for a long term that the whole design manufacture and operation of steam turbines and gas turbines are very successful and reliable. These turbines operate in a high-temperature high-pressure (very high gas flow velocity) environment, dense blades are spread all over a turbine surface to well prevent fluid from escaping and seeping. High-energy fluid totally impacts the turbine plane without obstruction, so that the fluid energy interception efficiency is very high. Through observation, a novel water turbine in Baihetan is also a dense-blade turbine actually, but the axial flow is not selected. The water goes into a flat turbine in a bevel manner, it is extension and improvement of water turbine water supply modes such as traditional water making, water milling and water grinding since ancient times without the modification by modern mathematical and physical concepts, the water turbine is provided with a blocking type prepositive facility, and this is worthy to be discussed. Moreover, the blades use boat-like propeller blades, and the processing is not easy in an aspect of the shape.

SUMMARY

The purpose of the present disclosure is to provide a basic mechanism for converting fluid energy into mechanical energy to greatly improve the use efficiency of the turbine fluid energy and the fluid resource utilization rate, so that the wind power, wind power generation technology and industry achieve substantial and significant breakthroughs.

The purpose of the present disclosure is achieved as follows: a basic mechanism for converting fluid energy into mechanical energy is characterized in that a hub cap, a cone cap seat, a hub main housing and a hub baseplate are fixedly assembled and connected to form a complete hub, a cross section of the hub is in a circular ring shape, the cone cap seat is disposed at an upper end of the hub main housing, the hub baseplate is disposed at a lower end of the hub main housing, a top surface of the cone cap seat is a downwards inclined cone surface, a turbine main shaft is fixedly assembled with the hub in a manner of vertically penetrating into the hub from an axial center position of the hub baseplate, a blade index plate, fluted disc hold-down devices, a rolling pressing wheel, bevel gears, a fluted disc, a gear, bearings and a stepping self-locking motor are disposed in the hub, the stepping self-locking motor is installed on the hub baseplate, the stepping self-locking motor is vertically fixed and disposed in a manner that an end surface with a power output shaft is upward, the gear is fixedly sleeved over the power output shaft, the fluted disc surrounds a built-in turbine shaft section of the turbine main shaft located in the hub generally in an annular state to form a through hole penetrating through a center of the fluted disc, a bottom of an annular body of the fluted disc is provided with a first tooth ring and a second tooth ring which surround the built-in turbine shaft section, the first tooth ring is disposed in a manner of surrounding the second tooth ring in a peripheral direction, the second tooth ring is disposed in a manner of surrounding the built-in turbine shaft section in a peripheral direction, the first tooth ring consists of outer oblique teeth continuously and uniformly distributed around the second tooth ring in a peripheral direction, the second tooth ring consists of inner straight teeth continuously and uniformly distributed on a shaft section located in the hub and around the turbine main shaft in a peripheral direction, the fluted disc and a protective cover plate are configured to jointly do autorotation around the built-in turbine shaft section, the blade index plate is disposed in an annular shape and is fixedly installed on an inner peripheral surface of the hub main housing, third shaft holes are uniformly distributed and formed on the blade index plate in a penetrating manner and in a peripheral direction, second shaft holes are uniformly distributed and formed on a peripheral wall of the hub main housing in a penetrating manner and in a peripheral direction, the bearing is installed in each of the third shaft holes, driving blade shafts uniformly distributed in a peripheral direction pass through the third shaft holes to be disposed in a manner of passing through the blade index plate in a radial direction, and pass through the second shaft holes to be disposed in a manner of passing through the hub main housing, the bearings are sleeved over shaft sections located in the third shaft holes, inner ends of the driving blade shafts extend out of an inner peripheral surface of the blade index plate inside the hub, outer ends of the driving blade shafts extend out of the hub, the driving blade shafts are correspondingly and uniformly distributed in a peripheral direction and in a manner of radially passing through the blade index plate through the third shaft holes, the inner end of each of the driving blade shafts is provided with the bevel gear, the fluted disc is installed on inner ends of the blade shafts through the first tooth ring, the outer oblique teeth of the first tooth ring and the bevel gears are mutually engaged, the inner straight teeth and the gear are mutually engaged, blade seats are fixedly connected to outer ends of the driving blade shafts, all of the blade seats are uniformly disposed in a peripheral direction around the hub and are respectively and fixedly connected with blades, the blades are in a center of an own width direction and generally extend in a radial direction of the hub of the blade, center lines of the blades are located in centers of the blades in a direction vertical to the radial direction of the hub and extend along length of the blades, the blades are generally in a cylinder surface shape, first shaft passing holes annularly and uniformly distributed around the hub are formed in a penetrating manner in the annular steel belt in a peripheral direction of the annular steel belt, one end of the blade shaft extending out from a root end of the blade is fixedly connected with the blade seat, an other end of the blade shaft extending out of a head end of the blade passes through the annular steel belt through the first shaft passing hole and is assembled with the annular steel belt in an autorotation manner, the annular steel belt is correspondingly connected with and penetrated through the blade shaft in a manner of surrounding the blade and the hub, the annular steel belt is fixedly connected to a shaft section of the turbine main shaft extending out from a top of the cone cap seat through an inhaul cable, the head end of the blade is fixedly provided with a blade baffle plate, the blade baffle plate is perpendicular to a plane tangential with the bottommost of an outwards protruded curve surface of the blade, and the blade baffle plate and an inwards recessed curve surface of the blade are in seamless contact fit.

BRIEF DESCRIPTION OF DRAWINGS

The present disclosure will be further illustrated in combination with drawings.

DETAILED DESCRIPTION

Figure 1A:
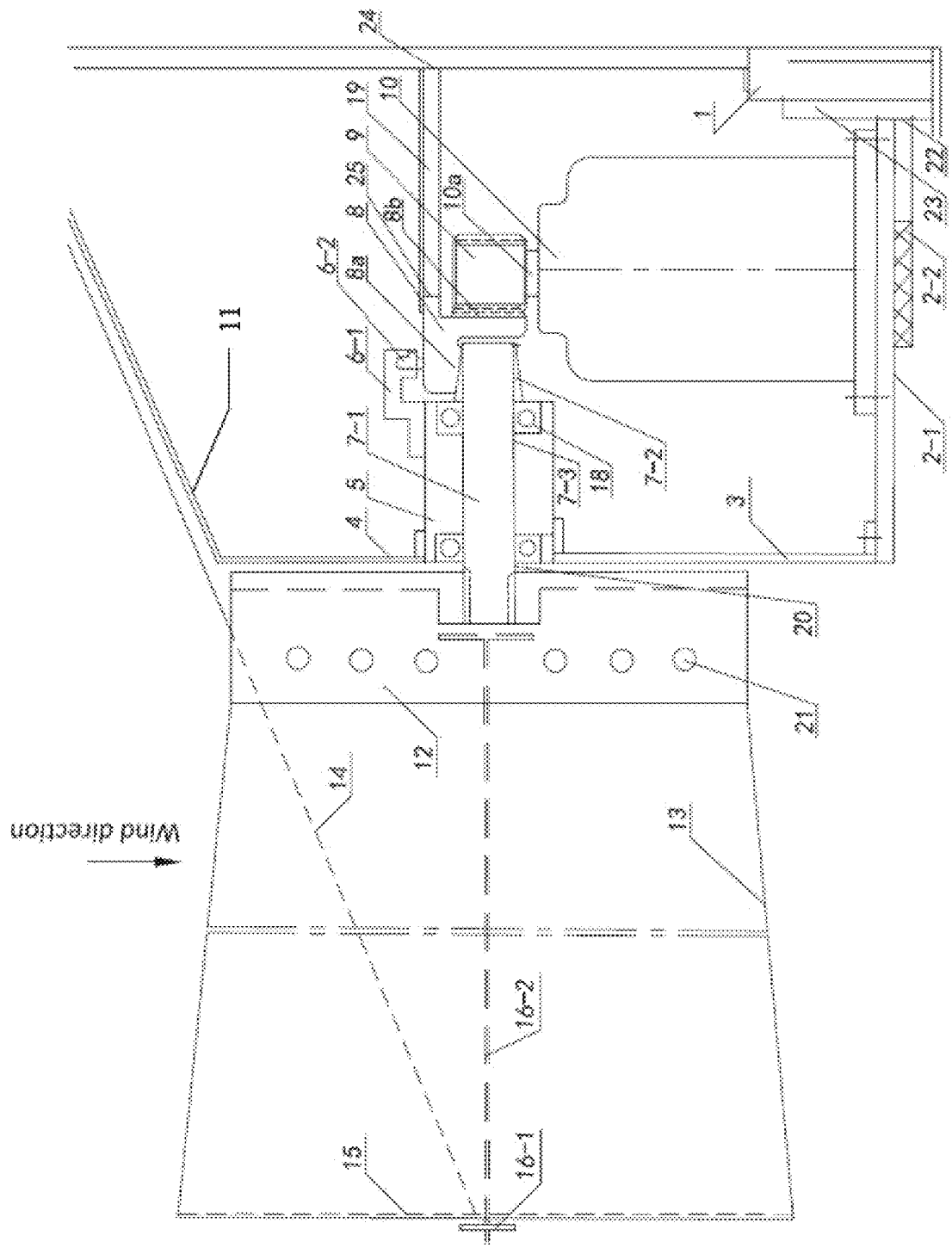
FIG. 1A is a schematic diagram of a front section view structure of a main body of the present disclosure.

A basic mechanism for converting fluid energy into mechanical energy, as shown in FIG. 1A to FIG. 2F, is characterized in that a hub cap 11, a cone cap seat 4, a hub main housing 3 and a hub baseplate 2-1 are fixedly assembled and connected to form a complete hub. A cross section of the hub is in a circular ring shape. The cone cap seat 4 is disposed at an upper end of the hub main housing 3. The hub baseplate 2-1 is disposed at a lower end of the hub main housing 3. A top surface of the cone cap seat 4 is a downwards inclined cone surface. A turbine main shaft 1 is fixedly assembled with the hub in a manner of vertically penetrating into the hub from an axial center position of the hub bottom (hub baseplate 2-1). The hub bottom (hub baseplate 2-1) is provided with a first shaft hole 22 in a penetrated manner. A shaft sleeve 23 is installed on the first shaft hole 22. The shaft sleeve 23 passes through the hub baseplate 2-1 through the first shaft hole 22 to be fixed to the hub baseplate 2-1. The shaft sleeve 23 is fixedly sleeved over the turbine main shaft 1. The turbine main shaft 1 passes through the hub baseplate 2-1 through the shaft sleeve 23 and the first shaft hole 22 to be fixedly connected to the hub baseplate 2-1 through the shaft sleeve 23 and the first shaft hole 22. A blade index plate 5, fluted disc hold-down devices 6-1, a rolling pressing wheel 6-2, bevel gears 7-2, a fluted disc 8, a gear 9, bearings 18 and a stepping self-locking motor 10 are disposed in the hub. The stepping self-locking motor 10 is installed on the hub baseplate 2-1. The stepping self-locking motor 10 is vertically fixed and disposed in a manner that an end surface with a power output shaft 10a is upward. The gear 9 is fixedly sleeved over the power output shaft 10a. The fluted disc 8 surrounds a built-in turbine shaft section of the turbine main shaft 1 located in the hub generally in an annular state to form a through hole 25 penetrating through a center of the fluted disc. A bottom of an annular body of the fluted disc 8 is provided with a first tooth ring and a second tooth ring which surround the built-in turbine shaft section. The first tooth ring is disposed in a manner of surrounding the second tooth ring in a peripheral direction. The second tooth ring is disposed in a manner of surrounding the built-in turbine shaft section in a peripheral direction. The first tooth ring consists of outer oblique teeth 8a continuously and uniformly distributed around the second tooth ring in a peripheral direction. The second tooth ring consists of inner straight teeth 8b continuously and uniformly distributed on a shaft section located in the hub and around the turbine main shaft 1 in a peripheral direction. A round protective cover plate 19 is assembled in the hub. A center position of the protective cover plate 19 is provided with a second shaft passing hole 24 in a penetrated manner. The built-in turbine shaft section is installed in a manner of passing through the protective cover plate 19 through the second shaft passing hole 24. An inner peripheral surface of the second shaft passing hole 24 and the built-in turbine shaft section are in radial clearance fit. An outer peripheral surface of an outermost edge of the protective cover plate 19 is spliced and fixed in a seamless manner with an inner peripheral surface of the through hole 25. The fluted disc 8 and the protective cover plate 19 can jointly do autorotation around the built-in turbine shaft section. The blade index plate 5 is disposed in an annular shape and is fixedly installed on the inner peripheral surface of the hub main housing. Third shaft holes 7-3 are uniformly distributed and formed on the blade index plate 5 in a penetrating manner and in a peripheral direction. Second shaft holes 20 are uniformly distributed and formed on a peripheral wall of the hub main housing 3 in a penetrating manner and in a peripheral direction. The bearing 18 is installed in each of the third shaft holes 7-3. Driving blade shafts 7-1 uniformly distributed in a peripheral direction pass through the third shaft holes 7-3 to be disposed in a manner of passing through the blade index plate 5 in a radial direction, and pass through the second shaft holes 20 to be disposed in a manner of passing through the hub main housing 3. The bearings 18 are sleeved over shaft sections located in the third shaft holes 7-3. Inner ends of the driving blade shafts 7-1 extend out of the inner peripheral surface of the blade index plate 5 inside the hub, and outer ends of the driving blade shafts extend out of the hub. The driving blade shafts 7-1 are correspondingly and uniformly distributed in a peripheral direction and in a manner of radially passing through the blade index plate 5 through the third shaft holes 7-3. The inner end of each of the driving blade shafts 7-1 is provided with the bevel gear 7-2. The fluted disc 8 is installed on inner ends of the blade shafts 7-1 through the first tooth ring. The outer oblique teeth 8a of the first tooth ring and the bevel gears 7-2 are mutually engaged. The inner straight teeth 8b and the gear 9 are mutually engaged. Blade seats 12 are fixedly connected to outer ends of the driving blade shafts 7-1. All of the blade seats 12 are uniformly disposed in a peripheral direction around the hub and are respectively and fixedly connected with blades 13. Each of the blade seats 12 is provided with installing holes. Threaded fasteners 21 are fastened on the installing holes through screw threads. The blades 13 are fixedly installed on the blade seats 12 through the mutually fastened installing holes and threaded fasteners 21. The blades 13 are in a center of an own width direction and generally extend in a radial direction of the hub of the blades 13. Center lines of the blades 13 are located in centers of the blades 13 in a direction vertical to the radial direction of the hub and extend along length of the blades 13. The blades 13 are generally in a cylinder surface shape. The blades 13 consist of solid blades 13-1 or hollow blades 13-2. An orthographic projection of each of the solid blades 13-1 in a radial direction of a cylinder where the solid blade is located is in an isosceles trapezoid shape. An inwards recessed curve surface 13-1a and an outwards protruded curve surface 12-1b of the solid blade 13-1 are in a cylinder surface shape. A cross section of the solid blade 13-1 is correspondingly in an arc line segment shape. A geometric center of a circle where the inwards recessed curve surface 13-1a is located is coincident with a geometric center of a circle where the outwards protruded curve surface 12-1b is located. A radius of the circle where the inwards recessed curve surface 13-1a is located is correspondingly smaller than a radius of the circle where the outwards protruded curve surface 12-1b is located. A thickness of the cross section of the solid blade 13-1 in each position is identical. The hollow blade 13-2 consists of an inwards recessed curve surface blade 13-2a and an outwards protruded curve surface blade 13-2b. Orthographic projections of the inwards recessed curve surface blade 13-2a and the outwards protruded curve surface blade 13-2b in a radial direction of a cylinder where the inwards recessed curve surface blade and the outwards protruded curve surface blade are located are respectively in an isosceles trapezoid shape. The inwards recessed curve surface blade 13-2a and the outwards protruded curve surface blade 13-2b are respectively in a cylinder surface shape. A cross section of the inwards recessed curve surface blade 13-2a and a cross section of the outwards protruded curve surface blade 13-2b are respectively and correspondingly in an arc line segment shape. Radii of circles where the inwards recessed curve surface blade 13-2a and the outwards protruded curve surface blade 13-2b are located are different, and geometric centers are mutually staggered along a cylinder shaft where the blade 13 is located. Symmetrical equal length edges of the inwards recessed curve surface blade 13-2a and symmetrical isosceles edges of the outwards protruded curve surface blades 13-2b are mutually attached and fixedly connected, so that a penetrating type gap 13-2c penetrating the blade 13 in a length direction of the hollow blade 13-2 is formed between the inwards recessed curve surface blade 13-2a and the outwards protruded curve surface blade 13-2b. A cross section of the penetrating type gap 13-2c is in a crescent shape. A thickness of the cross section of the penetrating type gap 13-2c correspondingly and symmetrically decreases in a direction of leaving away from a center line. An orthographic projection of the blade 13 in a radial direction of the cylinder where the blade is located is in an isosceles trapezoid shape, and a width in a direction perpendicular to the radial direction of the hub continuously increases (changes from narrow to wide) from a root end to a head end of the blade 13 in a direction of leaving away from the hub. Blade shafts 16-2 extend in a length direction of the blade 13 in a center of the penetrating type gap 13-2c, and pass through the blade 13 through the penetrating type gap 13-2c to be assembled with the blade 13. First shaft passing holes 16-3 annularly and uniformly distributed around the hub are formed in a penetrating manner in the annular steel belt 16-1 in a peripheral direction of the annular steel belt. One end of the blade shaft 16-2 extending out from a root end of the blade 13 is fixedly connected with the blade seat 12. An other end of the blade shaft 16-2 extending out of a head end of the blade 13 passes through the annular steel belt 16-1 through the first shaft passing hole 16-3 and is assembled with the annular steel belt 16-1 in an autorotation manner. The annular steel belt 16-1 is correspondingly connected with and penetrated through the blade shaft 16-2 in a manner of surrounding the blade 13 and the hub. The annular steel belt 16-1 is fixedly connected to a shaft section of the turbine main shaft 1 extending out from a top of the cone cap seat through an inhaul cable 14. The head end of the blade 13 is fixedly provided with a blade baffle plate 15. The blade baffle plate 15 is perpendicular to a plane tangential with the bottommost of an outwards protruded curve surface of the blade 13. The blade baffle plate 15 and an inwards recessed curve surface of the blade 13 are in seamless contact fit.

Design Concept and Basis of Turbine Structure of the Present Disclosure:

The novel turbine of the present disclosure uses steam turbine axial flow dense thin blades. In wind power, artesian hydraulic and dam type hydropower stations, fluid directly impacts the turbine plane, and no prepositive diversion portion is used. It is favorable for sufficient interception of the fluid. The structure consists of a group of blades in a special shape.

In a wind power machine and an artesian hydraulic machine, in order to deal with the instable wind and artesian water, an exquisite large-angle-position stepless variable-angle system is arranged in a turbine hub, and a turbine structure is as shown in FIG. 1 (FIG. 1A, FIG. 1B, FIG. 1C and FIG. 1D) and FIG. 2 (FIG. 2A, FIG. 2B, FIG. 2E and FIG. 2F).

In the design of the wind power machine and the artesian hydraulic machine, due to the variable-angle system with various blades of the present disclosure, the hub may be made to be bigger, and the wind power and hydraulic power exerted on the hub surface can be transferred to blade regions through a hub paracone tip cap, and the torque of a turbine shaft may be increased. The hub diameter of the present disclosure is larger, the blades 13 can be installed without distortion, but the cross section needs to be in a "crescent" shape (generally in a cylinder surface shape), as shown in FIG. 1C and FIG. 1D, and the arrangement and angle position change of the blades 13 with the crescent-shaped cross section are as shown in FIG. 2A, 2B, FIG. 2C, 2D, FIG. 2E and FIG. 2F. An angle position line is named by using an included angle of a tangent line using a midpoint "O" of the crescent arc as a tangent point and a midpoint connecting line OO' of the turbine blades. It is considered based on the following aspects: 1. The blades are arranged in angle positions according to FIG. 2A, FIG. 2B, FIG. 2C and FIG. 2E in a manner that an included angle with a turbine rotating surface is between 25° to 90°, as shown in FIG. 2A, 2B, FIG. 2C, 2D and FIG. 2E, during operation, the impact force of the fluid on the recessed surfaces of the blades 13 is always greater than the impact force on the protruded surfaces of the blades 13, or the fluid always advances towards the recessed surfaces of the blades 13, and the fluid exerts pressure on the recessed surfaces of the blades 13 in a whole process after entering a passage between the two adjacent bent blades 13. The reason is that the fluid with a certain flow rate and flow velocity has an inertia of passing along a straight line. In order to conveniently understand the fluid inertia phenomenon, the water inertia is taken as an example herein. According to macroscopic phenomena in daily life, if there is water passing through a thin-wall bent broken-end hose, when a water pressure in the hose is very low, the hose has no response in a case that water gently flows, and the bent hose starts to be straightened in a case that the water pressure is gradually increased until the pressure exceeds the static inertia of the hose. If the pressure is continuously increased to a certain value, the bent portion becomes straight, and moreover, the water hose may retreat in a direction opposite to the water ejection direction (tail jet effect) due to the ejection force at a water outlet. In another practice, by taking an impact behavior of the waterflow in a river on a bent bank as an example, water runs in a flat and straight river bed at a certain flow velocity and a certain low rate, supposed that the waterflow is formed by countless parallel waterflow lines, when these waterflow lines are suddenly in contact with a bank with a certain contact angle, the waterflow lines sequentially touch the bank according to the originally located positions at first, the waterflow lines firstly touching the bank transfer partial energy onto the bank and then go advance through being reflected (since the waterflow is in a state that waves continuously push forward waves), at the same time, each waterflow line may go advance and is interfered by the impact of the waterflow lines which go advance after touching the bank and being reflected, and the waterflow lines are collided with each other, change the positions and are mixed to become ripple flow. If the front bank gradually becomes straight and gentle, the waterflow lines which have become the ripple flow may be reintegrated into new co-current flow bringing the rest energy to flow to the downstream basically without obstruction. However, if the front bank is still bent, the "fluid behavior" will continuously occur, the waterflow energy will be continuously transferred onto the bent bank. The phenomenon may be very clearly observed in all the quicksand trends in bent riverbeds and sand dune accumulated shapes or on the scene. This is exactly the reason why some sandy banks of rivers with a certain bending degree collapse to the downstream again and again under the condition without dam construction. "Bent banks are impacted by the waterflow" is a very complicated mechanical process of a hydro-kinetic behavior: fluid kinetic energy loss-transfer principle, and is a very common phenomenon. It is just a point that will be utilized by the present disclosure. A theoretical support point of the crescent-shaped blade is here. 2. In a steam turbine, the whole turbine disc surface is small, the blades are small and many, the high-pressure steam energy intercepted by one stage of turbine blades is limited, and the purpose can only be achieved by multiple stages. However, the wind power machine and artesian hydraulic machine turbines are unnecessary to be made to a multi-stage type, and the focus may be on the blades. A system engineering novel model capable of intercepting the fluid energy to the maximum extent is further started to be built through novel turbines and relevant matched arrangement.

Figure 2A:
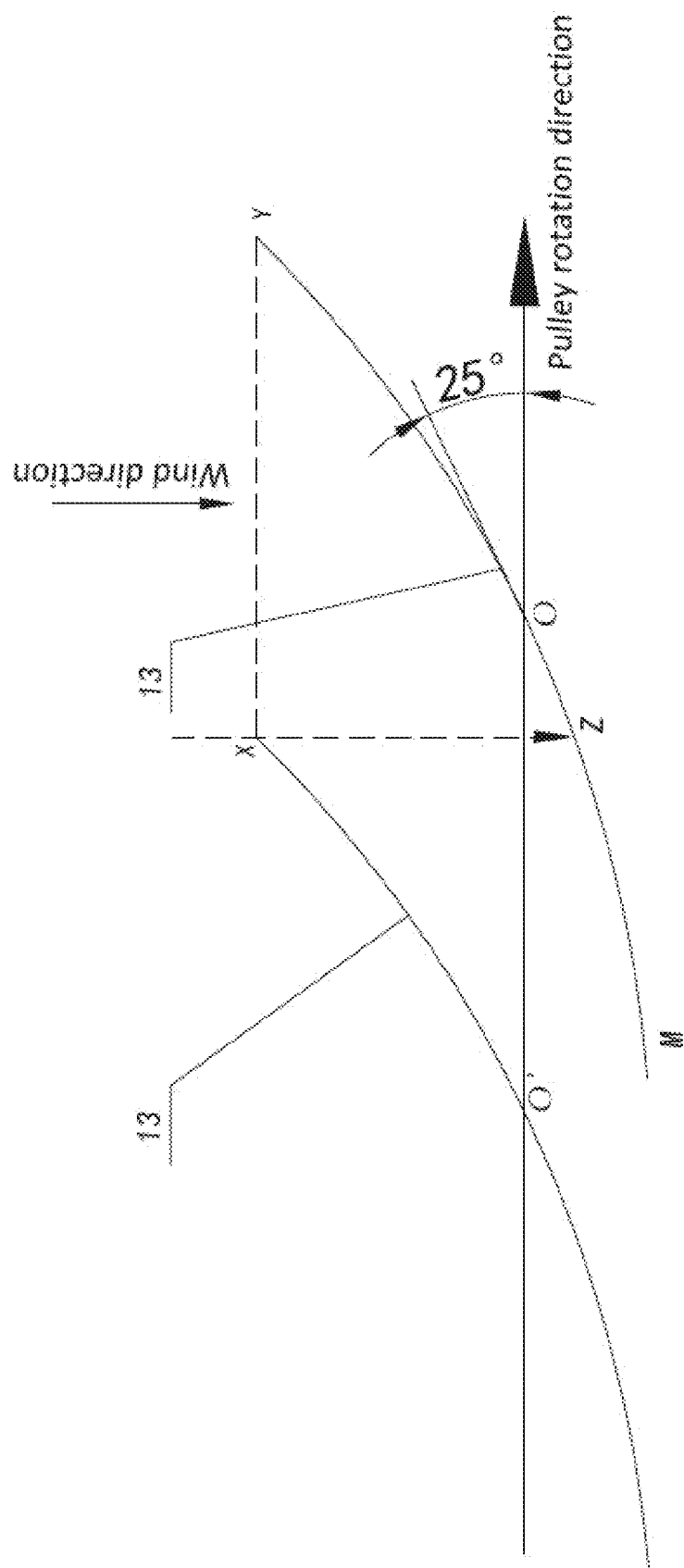
FIG. 2A is a schematic diagram of a cross section space attitude structure of the present disclosure in a case that two adjacent blades form a 25° included angle relative to a horizontal plane.
Figure 2B:
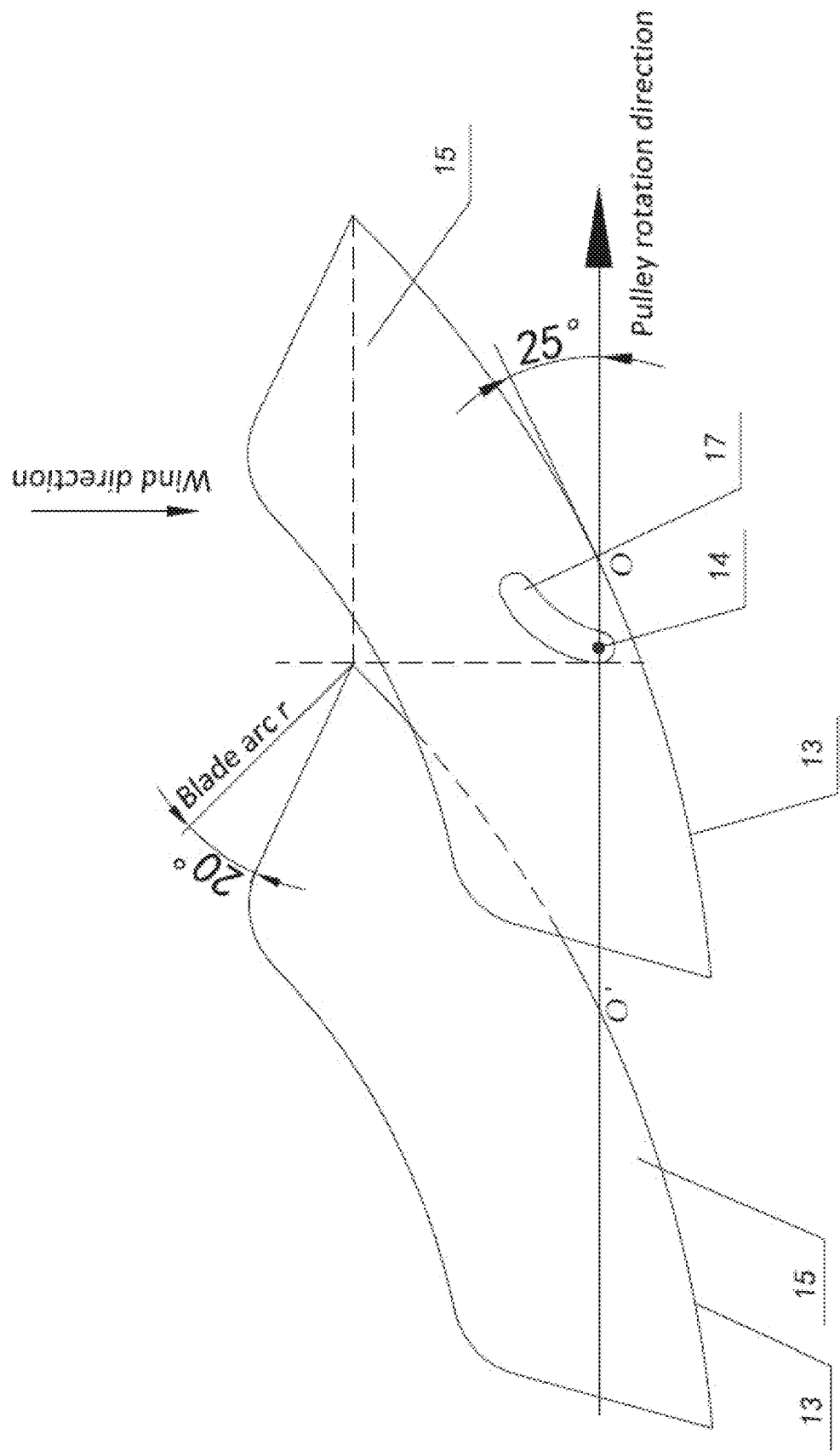
FIG. 2B is a schematic diagram of a space attitude structure of two adjacent groups of blade baffle plates and blades thereof of the present disclosure in a case that the blades form a 25° included angle relative to a horizontal plane.
Figure 2C:
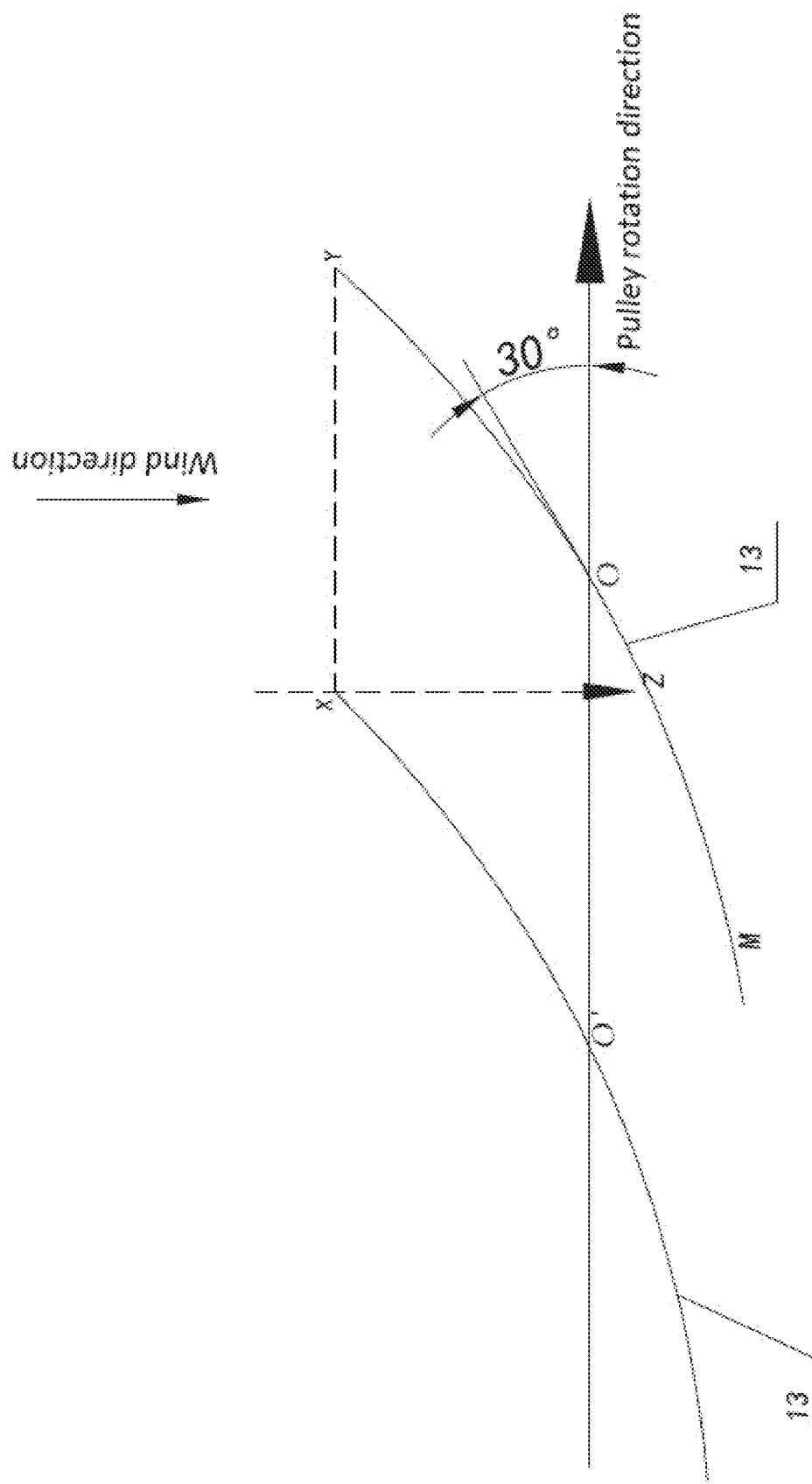
FIG. 2C is a schematic diagram of a cross section space attitude structure of the present disclosure in a case that two adjacent blades form a 30° included angle relative to a horizontal plane.
Figure 2D:
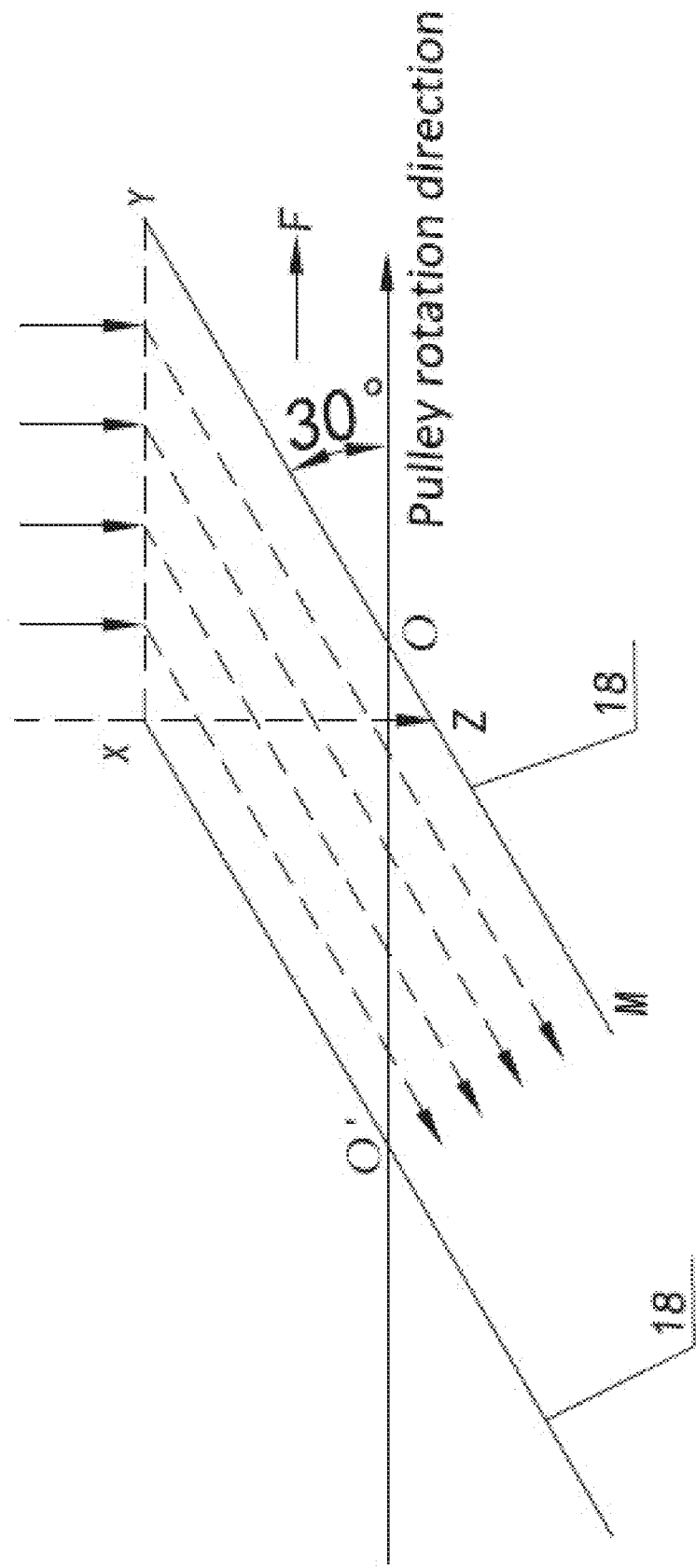
FIG. 2D is a schematic diagram (schematic diagram of a principle for study) of a cross section space attitude structure of the present disclosure in a case that two adjacent flat straight blades form a 30° included angle relative to a horizontal plane.

Design Idea and Operation Interpretation of Novel Turbine:

1. Due to the curve surface design of the crescent shape of the blades 13, in any angle position of the blades 13 at a swing angle smaller than 90°, as shown in FIG. 2A, 2B, in a case of an included angle being 25° formed between the turbine rotating surface and the blades, a blade passage is always in a gradually reduced convergent form, and the two blades 13 look like a bent ox horn. The wind (air) has great compressibility, so when the wind will be squeezed when entering the bent and gradually reduced passage, and will necessarily enhance the impact force on the recessed surfaces of the blades 13. The problem will be illustrated by taking FIG. 2C and FIG. 2D to analyze the process that the wind impacts the two blades. In FIG. 2D, we use flat straight blades for analysis. Herein, the included angle is 30°, and the point O is a rotating axis of the blades 13. That is, for a blade shaft 16-2 in FIG. 1A, a space OO' of the two blades is 1.075 of a half of the blade YM. From FIG. 2D, XZ is an edge line of wind beams near a rear blade after entering the blade passage, a falling point is Z, ZM is an overlapping portion of the two blades 13, and a turbine of a steam turbine and a water turbine of a Baihetan power station are not provided with such an overlapping portion. XY is a wind inlet line of the passage of the blade 13, so that there is $\triangle$ XYZ. In FIG. 2D, each arrow above XY represents a wind flow line (i.e., wind energy motion quantity). Each flow line will be blocked by the YM of the blade 13 when going across the XY line to enter a triangular region XYZ, mutual extrusion, collision, mixing and position change may occur, and partial energy transfer may be completed, so that the blade YM may generate a peripheral thrust "F" on the turbine, and then, the wind beams may be (approximately) reintegrated into new co-current flow bringing the rest energy to enter a rear passage through the XZ line, and the wind beams can be exhausted without obstruction after passing through the XZ line. A turbine of a steam turbine and a water turbine of a Baihetan power station are not provided with such a rear passage. In this case, the passage of the blade 13 has been compressed to about a half of an original windward side.

Since the blades are flat and straight, in this case, the wind power has no force transfer effect on the ZM portion of the blade 13, and the wind directly goes away along with the passage of the blade 13. The gone wind energy is about forty percent of the wind energy at an inlet, and this is a defect of the flat straight blades. If the crescent-shaped blades are adopted, the conditions will be different. In FIG. 2C, the XYZ Δ is similar to the Δ region in FIG. 2D, and the two regions both have the same energy transfer effect. In FIG. 2D, the width of the ZM of the blade 13 is 0.4 of the width of the YM of the whole blade, and the portion is the overlapping portion. The passage behind the XZ of the crescent-shaped blade 13 in FIG. 2C still shrinks, and the cross section area of the wind passage at a wind outlet is only about ¼ of the cross section area of an original inlet. Therefore, the wind velocity will be necessarily accelerated. The accelerated wind will push the ZM portion of the bent blade, this is the condition that "fluid with a certain flow rate and flow velocity has an inertia of passing along a straight line" as mentioned above. In addition, the fluid is discharged in an accelerated manner in the continuously shrunk passage, there is a reaction thrust acting on MZ, and the thrust "F" in a peripheral direction of the turbine may be enhanced. In FIG. 2D, the ZM overlapping section of the flat straight blade is meaningless, so that the water energy utilization rate of the crescent-shaped blade 13 is certainly high, the utilization rate is estimated to be 0.7 to 0.8, and this estimated value is obtained through deduction step by step according to the above method. The effect cannot be reached by a turbine formed by flat straight blades. In a turbine formed by the crescent-shaped blade 13, if the included angle between the blade 13 and the turbine rotating surface is smaller, the accelerated discharge speed of the fluid is faster, so that the reaction thrust is stronger. All of these are favorable for the fluid energy utilization rate improvement. However, if the included angle is too small, the flowing of the fluid is unsmooth, the force will become the resistance, the fluid pressure is directly exerted on a turbine disc, there is an optimum angle position needing to be determined through a wind blowing experiment, the blades 13 with different curvatures have different optimum angle positions, and in FIG. 2F, the arc YM (whole blade) radius R is temporarily determined to be 2.5 of the length of the length OO.

Figure 2E:
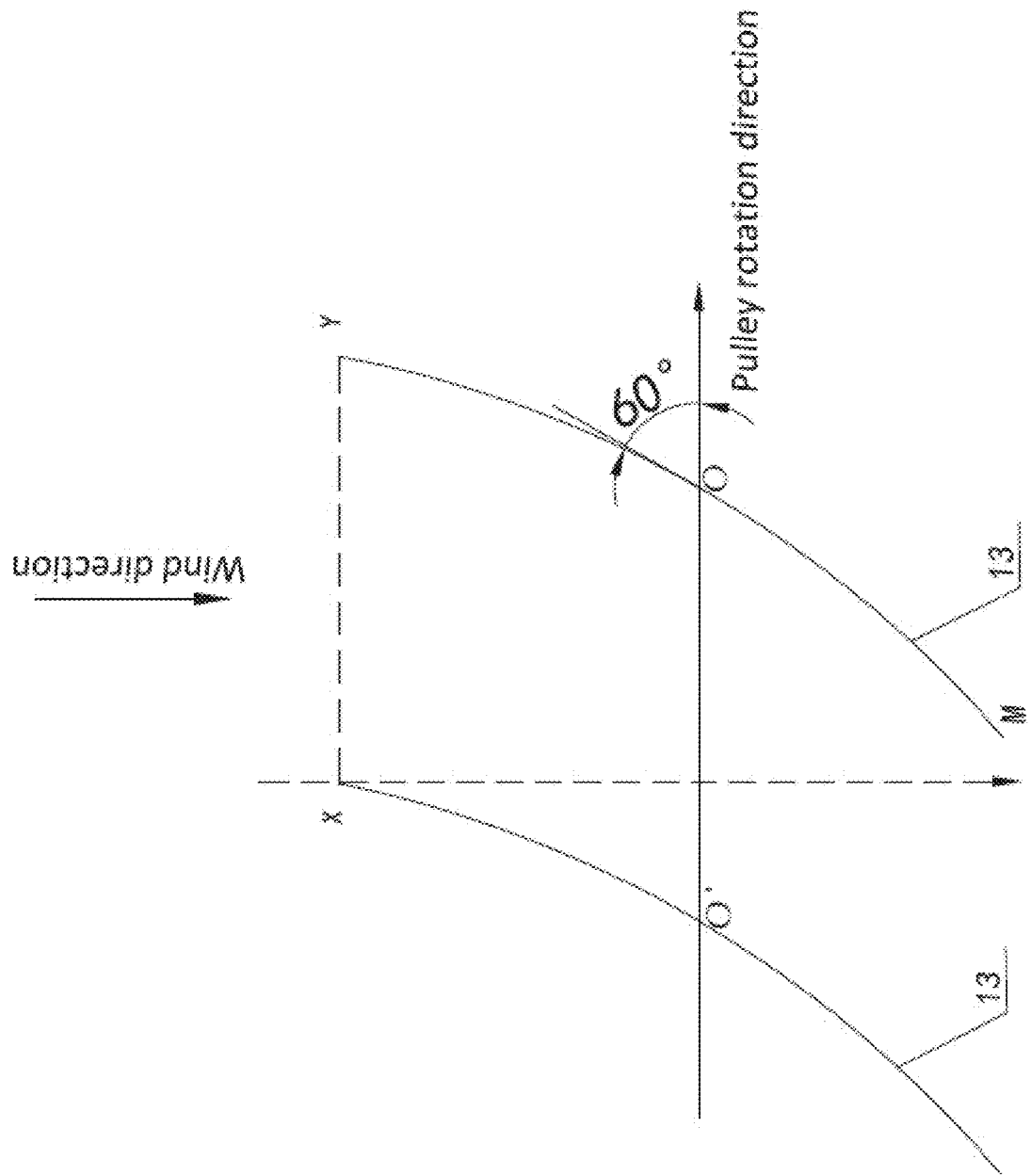
FIG. 2E is a schematic diagram of a cross section space attitude structure of the present disclosure in a case that two adjacent blades form a 60° included angle relative to a horizontal plane.
Figure 2F:
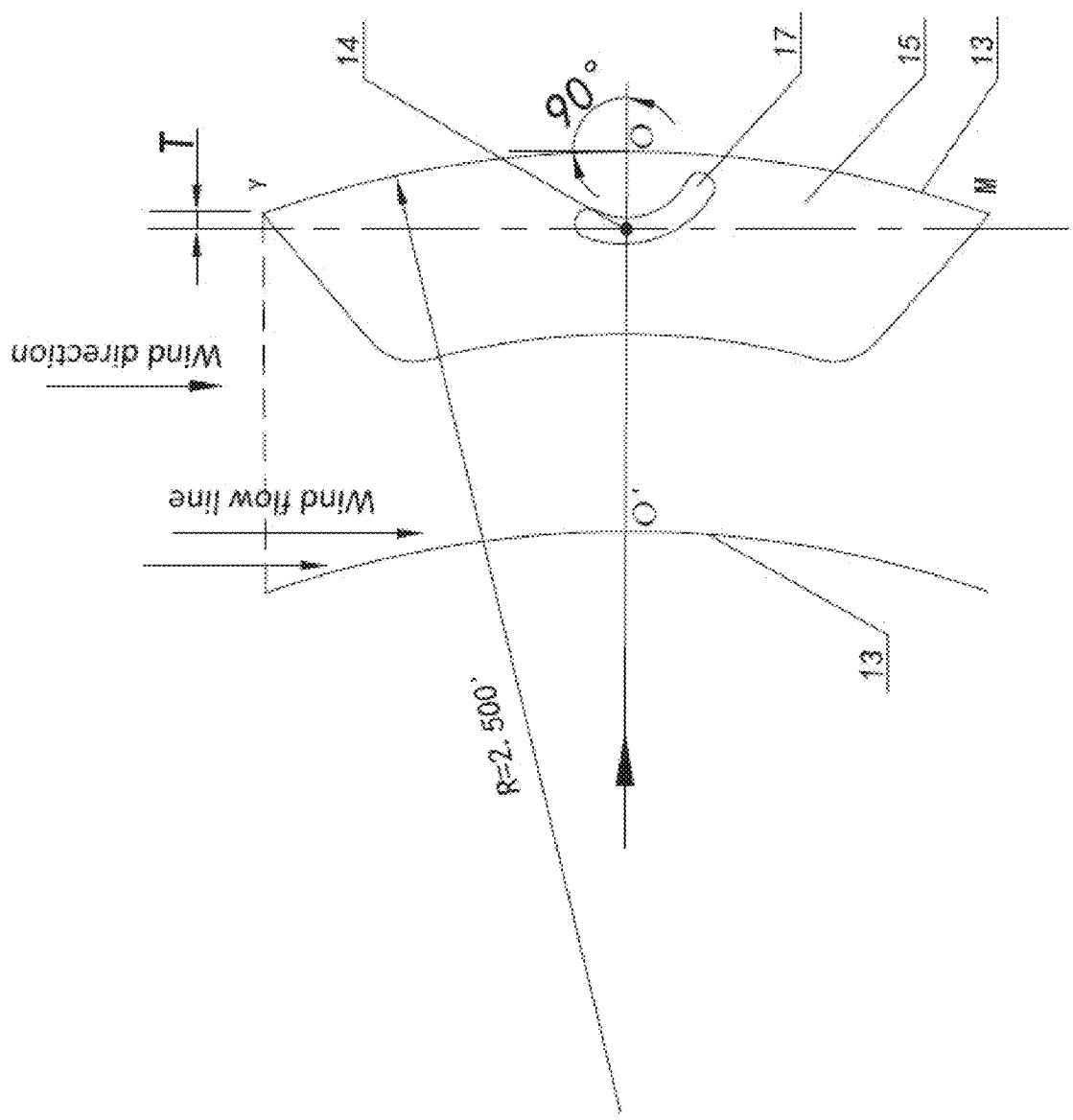
FIG. 2F is a schematic diagram of a space attitude structure of a single group of blade baffle plates and blades thereof of the present disclosure in a case that the blades form a 90° included angle relative to a horizontal plane.

2. The wind turbine is a machine type with a larger diameter and thin blades. The arc-shaped design is favorable for the rigidity of the blades 13. The large-size turbine can be additionally provided with blade ribs: a blade shaft and multiple branch ribs (blade veins) in the middle of a length direction of the blades. Electric heating wires may be added onto the blade veins. For example, an electric blanket may be added for an anti-freezing purpose in winter. A wind turbine has a large size, and does non-directional rotation, so a surrounding housing cannot be used. In order to prevent wind energy escape, a blade baffle plate 15 perpendicular to the blade 13 is made at an outer end of the blade 13. As shown in FIG. 2B, under a condition that the included angle is 25° and the two blades intersect, the blade baffle plate 15 has an effect of enhancing the blade rigidity. At a low wind velocity, it is very important to improve the wind energy utilization rate. The width of the blade baffle plate 15 is a half of a chord length of an index circle in this position, and the baffle plate is called as a half baffle plate. As shown in FIG. 2F, an arc-shaped through hole 17 is formed in a middle portion of the blade baffle plate 15, the arc-shaped through hole 17 is formed for an inhaul cable 14 for respectively connecting the turbine main shaft 1 and an annular steel ring 16-1 outside the blade 13, and the inhaul cable 14 is connected with the annular steel ring 16-1, and can resist the wind tension. An outer end of the blade shaft 16-2 is (rotatably) inserted into a preset hole (shaft hole) formed in the annular steel ring 16-1 in a penetrating manner, so that the blade 13, the annular steel ring 16-1 and the inhaul cable 14 form a mutually restricted whole body. The inhaul cable 14 is connected with the annular steel ring 16-1 through passing through the arc-shaped through hole 17. When the blade 13 rotates, the arc-shaped through hole 17 provides a moving space for the inhaul cable 14. As shown in FIG. 2B, when the angle position of the included angle becomes 25°, the baffle plate has actually and totally blocked the outer periphery of the blade, this conforms to that "the wind cannot be lost at a lower wind velocity", and the wind shall be abandoned at a high wind velocity. Therefore, the arrangement of the half baffle plate is sufficient. From FIG. 2B and FIG. 2C, it can be seen that a distance from the point o of the axis of the blade to the center of the arc-shaped through hole 17 formed in the inhaul cable 14 is 0.2 to 0.3 of the index arc, and the inhaul cable 14 is enabled not to be interfered when the blade rotates. Moreover, when the blade 13 is controlled to be at 25° or to rotate to 95° to 100° (reverse braking by wind power), the blade 13 and the inhaul cable 14 are not in contact with each other.

3. For the length, width and thickness of the blade 13, the width of a root end of the blade and the circle (hub outer circle) where the root end of the blade is located, since the turbine disc formed by the blades, the hub housing, etc. is very big, the blades are many, and the wind energy density is not high, the wind turbine hub cannot be made to be too small, a sufficient moving space needs to be left for the variable-angle system of various blades, the wind energy on the area of the big hub is guided to the blade region through a pointed fan housing (hub cap 11) in front of the hub, and it will increase the wind energy density in the blade region and increase the rotation moment on the contrary. In FIG. 2A, at the 25° angle position of the blades, the bent blade arc ZM length is longer than an arc line ZM of a 30° included angle in FIG. 2C. That is, the wind energy utilization of the blades at the 25° included angle is higher than the wind energy utilization rate at the 30° included angle, and it is obvious. Furthermore, a wind outlet at the 25° included angle is smaller than the wind outlet at the 30° included angle. In this case, the cross section area of the wind outlet is only about ¼ of the cross section area of the wind inlet. At the wind velocity of the same time period, the generated reactive thrust will be greater at the higher exhausted wind velocity, the force promoting the turbine to rotate will be stronger, and it is a special wide-angle-position variable-angle function of the crescent blade. From the given blade angle position figures (FIG. 2A, 2B, FIG. 2C, 2D, FIG. 2E and FIG. 2F), the falling point Z of the wind beam edge line XZ is closer to the tail end of the front blade if the included angle of the blades 13 is greater. If the included angle exceeds 60°, there is no point Z of the XZ line as shown in FIG. 2E, the wind cannot touch the blades, and the wind utilization rate is very low. If the included angle is 85° to 90°, as shown in FIG. 2F, the state is a wind cut-out state, the wind achieves no effect on the blades, and the turbine stops rotating.

4. By analyzing each angle position figure, it is easy to observe that the diameter of the wind outlet at the point M is in relation to the curvature of the blades. The greater the curvature, the smaller the outlet at the point M. As shown in FIG. 1C, the radius of the circle where the inner arc of the blade 13 (big turbine blade) is shown. According to the angle position figures, as shown in FIG. 2C, a chord length in this position of the index circle at a top end of the blade is set to be OO', the chord length of a half of the blade arc is OM, and OO'=1.075-1.1 OM is set. It is applicable to the top end of the blade, the whole arc length at a bottom end of the blade takes 0.6 of the total arc length of the top end of the blade. The thickness from the top end of the blade to the bottom end of the blade is gradually increased, and the width is decreased. The thickness needs to be increased to ensure the intensity of the blade 13.

5. The circle (containing the blade seat) where the bottom end of the blade is located is the blade index plate 5 in FIG. 1A. The size of the outer circle of the hub needs to be considered from the power of the wind power machine. After the power is determined, the power shared to each blade needs to be obtained. As shown in FIG. 1A, in the blade power, firstly, the shaft diameter and shaft length of the driving blade shaft 7-1 at the bottom end of the blade at the maximum load intensity needs to be estimated, then, the gear shafts (including the bearings 18) are distributed in a peripheral direction, and the blade root circle (the circle where the bottom end of the blade is located) can be easily determined. Moreover, as shown in FIG. 1A, the thickness of the blade seat 12 is also determined by the blade root circle and the index number, the thickness of the blade seat 12 is in relation to the periphery size of the hub, when the angle position of the blade 13 is changed to the minimum angle position of 25°, the adjacent surfaces of the adjacent blade seats 12 cannot be collided with each other. From FIG. 2C, it can be seen that when the included angle of the blade 13 is 30°, an angle at an outlet of the blade 13 is less than 20°. In FIG. 2A, when an included angle of the blade is 25°, the passage outlet of the blade 13 is not closed, and there is still a gap.

Variable-Angle System

Figure 1B:
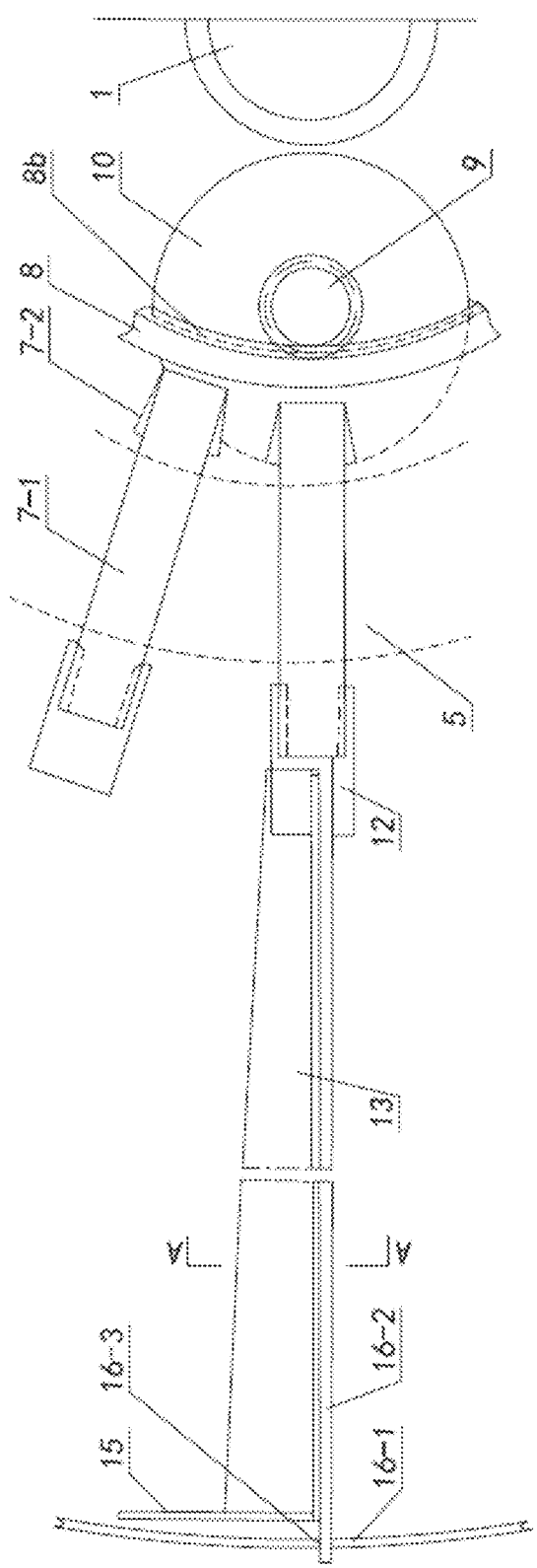
FIG. 1B is a schematic diagram of a top section view structure of a main body of the present disclosure.
Figure 1C:
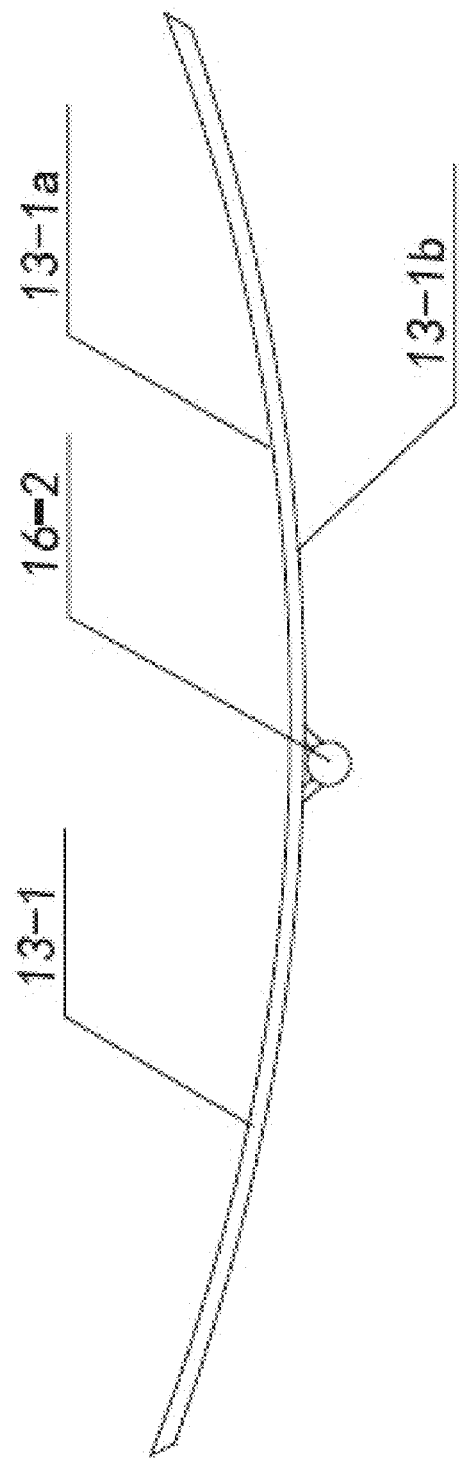
FIG. 1C is a schematic diagram of a cross section structure of Embodiment 1 of a blade of the present disclosure.
Figure 1D:
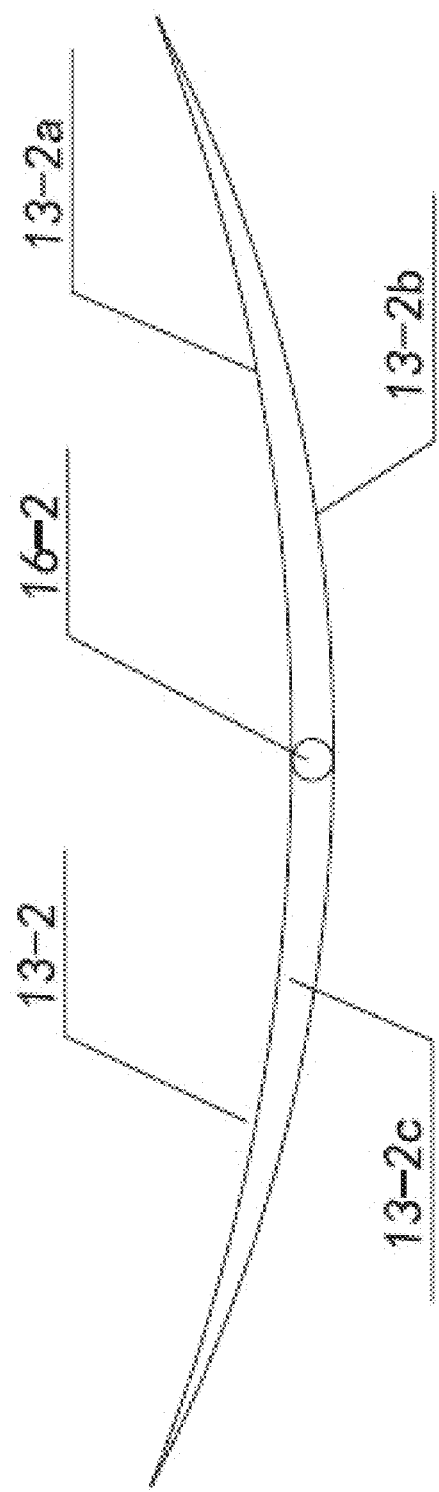
FIG. 1D is a schematic diagram of a cross section structure of Embodiment 2 of a blade of the present disclosure.

As shown in FIG. 1A and FIG. 1B, the turbine main shaft 1 may also be used as an external power supply inlet, the hub baseplate 2 is used as the basis, the hub housing 3 is used as a support, the blade index plate 5 (achieving an inertia wheel effect) is installed, and the bevel gears 7-2 are annularly and uniformly distributed on the blade index plate 5. The annular fluted disc 8 provided with the outer oblique teeth 8a and inner straight teeth 8b is disposed at the outer side of a group of bevel gears 7-2, the fluted disc 8 is stably engaged with the bevel gears 7-2, the blade index plate 5 is used as the basis, multiple fluted disc hold-down devices 6 (mould weights) with rollers are used, the power output shaft extending out from the top end of the controlled stepping self-locking motor 10 is provided with the gear 9, and the angle of the blade 13 changes when the stepping self-locking motor 10 rotates. When the wind turbine does not work, the blade 13 shall maintain a cut-out state of 85° to 90°. As shown in FIG. 2F, no working is not equal to no wind, and a wind signal acquirer can transmit A signal to a microelectric controller as long as there is wind. When the wind power machine needs to be started, the microelectric controller matched with the stepping self-locking motor 10 to be used sends electric signal instructions to the stepping self-locking motor 10 to control the stepping self-locking motor 10 to finally drive the blade 13 to change angle. The motor rotates the blade from 90° to an angle position suitable for the power generator to start to begin to work. When a power grid or a wind power system needs to be shut down and offline, the microelectric controller will instruct the motor to shut down. However, the motor cannot be shut down immediately due to the inertia of the wind wheel, in this case, the microelectric controller is provided with a blade angle rotating mechanism capable of rotating the blade to an angle of 90° to 100°, i.e., the blade rotates in a reverse direction, the braking is realized with the help of wind power, and in addition, an electromagnetic mechanical brake disc 2-2 is used for turbine braking. A gap T in FIG. 2F is a blade edge moving region during reverse braking by wind power. The cross section point L of the inhaul cable 14 passing through the arc-shaped through hole 17 of the half baffle plate is in relation to the gap T.

Significance of Developing Turbine Type Wind Power Machine and Hydraulic Machine of Steam Turbine The development and utilization of green and clean energy is a permanent topic. Even if the successful development of nuclear fusion power generation is used as a supplement, the development and utilization of other green energy will not be less. It is worthy of discussion in aspects of natural wind, artesian water and dam construction water energy utilization efficiency. The design concept of fluid energy conversion and the structural form operation concept are factors determining the energy conversion efficiency. At the beginning of the present disclosure, it has been mentioned that the three-blade fan energy interception form is secondary conversion, and it is certainly so effective as primary direct conversion. Because during the secondary conversion, there is energy loss in the first conversion process, the sweep area, occupation area and airspace of a three-blade fan are very huge, but the wind energy utilization rate is not very high. Therefore, the efforts to explore the improvement of wind and water energy utilization rate have been always carried out. A used turbine type wind and water turbine of the steam turbine is a small-size light-weight artesian energy conversion device, the conversion rate is expected to reach 0.7 to 0.8, and only a value of 0.6 is taken in the following examples. In nature, for the wind energy, the low-wind-velocity area is the most widely distributed, and the duration is longer. In the three-blade fan, the cut-in wind velocity is generally 3 m/s to 5 m/s. If the present disclosure is adopted, the cut-in wind velocity can be accelerated to 2 m/s to 3 m/s, the rated wind velocity capable of being accepted by the three-blade fan is about 11.4 m/s to 13.5 m/s, and some three-blade fans may also use the rated wind velocity of 14 m/s to 16 m/s, a matched power generator selects a power generator matched with this shift of wind velocity. Therefore, the wind power duration in a region of this wind velocity shift is considerable. If the value exceeds this shift, the wind power machine needs to adjust the angle to abandon the wind, and the utilization rate is reduced. The wind power of 9 m/s to 11 m/s below this shift cannot reach the rated requirement of the power generator, the rated wind velocity can be accelerated to 9 m/s to 11 m/s by using the wind turbine of the present disclosure, and the power generator can reach the rated output. However, if the value exceeds 11 m/s, the wind energy is excessive, and the wind may be abandoned again. Therefore, the wind energy utilization rate improvement is meaningless. From data, double-winding is adopted for solving the problem, but the weight of a machine unit is increased, and the power is not improved too much. Therefore, another power generator needs to be introduced to receive the wind energy obtained through high wind velocity. However, it is infeasible on the arrangement method of the original three-blade wind power generation system. Therefore, a high-altitude variable-speed device and a power generator may be both placed on the ground under a tower, only a wind power machine, a brake, a V drive and a rudder are remained at the upper side, and double engines may be arranged after the gravity center moves down. Therefore, the low-position installation, the management and repair are convenient, and a tower frame becomes much lighter.

According to the present disclosure, the fluid vertically impacts the turbine plane, no prepositive facility, such as a volute, a diversion trench and a guide vane, is arranged in front of the turbine. According to the present disclosure, the plane turbine formed by the crescent-shaped blade and the gradually reduced and overlapped rear passage formed by stepless angle change used in wind energy and artesian water energy are a key for efficiently intercepting the fluid energy. The fluid entering the bent and gradually reduced passage will exert the pressure on the recessed surfaces of the blade in the whole process, and it conforms to a principle that "bent banks are impacted by the waterflow". The fluid may be discharged in an accelerated manner through the gradually reduced passage of the plane turbine formed by the crescent-shaped blades, the rotating power of the turbine can be enhanced through the caused tail jet effect, and the energy efficiency is improved. The crescent-shaped blades are only applicable to a single-stage turbine. Through the dense crescent-shaped blades and the stepless angle change, the wind energy acquisition area is wide, the interception rate is high, and the gravity center of the wind power machine can move down by using double engines, so that the installation on a building roof in urban areas can be convenient, and for the urban electricity, local materials may be used. The present disclosure utilizes wide-angle-position angle change, the blades can be inverted to a proper degree, and the turbine is locked through wind power reverse braking and mechanical electromagnetic braking.

What is claimed is:

1. A basic mechanism for converting fluid energy into mechanical energy, wherein a hub cap, a cone cap seat, a hob main housing and a hub baseplate are fixedly assembled and connected to form a complete hub, a cross section of the hub is in a circular ring shape, the cone cap seat is disposed at an upper end of the hub main housing, the hub baseplate is disposed at a lower end of the hub main housing, a top surface of the cone cap seat is a downwards inclined cone surface, a turbine main shaft is fixedly assembled with the hub in a manner of vertically penetrating into the hub from an axial center position of the hub baseplate, a blade index plate, fluted disc hold-down devices, a rolling pressing wheel, bevel gears, a fluted disc, a gear, bearings and a stepping self-locking motor are disposed in the hub, the stepping self-locking motor is installed on the hub baseplate, the stepping self-locking motor is vertically fixed and disposed in a manner that an end surface with a power output shaft is upward, the gear is fixedly sleeved over the power output shaft, the fluted disc surrounds a built-in turbine shaft section of the turbine main shaft located in the hub generally in an annular state to form a through hole penetrating through a center of the fluted disc, a bottom of an annular body of the fluted disc is provided with a first tooth ring and a second tooth ring surrounding the built-in turbine shaft section, the first tooth ring is disposed in a manner of surrounding the second tooth ring in a peripheral direction, the second tooth ring is disposed in a manner of surrounding the built-in turbine shaft section in a peripheral direction, the first tooth ring consists of outer oblique teeth continuously and uniformly distributed around the second tooth ring in a peripheral direction, the second tooth ring consists of inner straight teeth continuously and uniformly distributed on a shaft section located in the hub and around the turbine main shaft in a peripheral direction, the fluted disc and a protective cover plate are configured to jointly do autorotation around the built-in turbine shaft section, the blade index plate is disposed in an annular shape and is fixedly installed on an inner peripheral surface of the hub main housing, third shaft holes are uniformly distributed and formed on the blade index plate in a penetrating manner and in a peripheral direction, second shaft holes are uniformly distributed and formed on a peripheral wall of the hub main housing in a penetrating manner and in a peripheral direction, the bearings are respectively installed in each of the third shaft holes, driving blade shafts uniformly distributed in a peripheral direction pass through the third shaft holes to be disposed in a manner of passing through the blade index plate in a radial direction, and pass through the second shaft holes to be disposed in a manner of passing through the hub main housing, the bearings are sleeved over shaft sections located in the third shaft holes, inner ends of the driving blade shafts extend out of an inner peripheral surface of the blade index plate inside the hub, outer ends of the driving blade shafts extend out of the hub, the driving blade shafts are correspondingly and uniformly distributed in a peripheral direction and in a manner of radially passing through the blade index plate through the third shaft holes, the inner end of each of the driving blade shafts is provided with the bevel gears, the fluted disc is installed on the inner ends of the driving blade shafts through the first tooth ring, the outer oblique teeth of the first tooth ring and the bevel gears are mutually engaged, the inner straight teeth and the gear are mutually engaged, blade seats are fixedly connected to the outer ends of the driving blade shafts, all of the blade seats are uniformly disposed in a peripheral direction around the hub and are respectively and fixedly connected with blades, the blades are in a center of an own width direction and generally extend in a radial direction of the hub of the blades, center lines of the blades are located in centers of the blades in a direction vertical to the radial direction of the hub and extend along length of the blades, the blades are generally in a cylinder surface shape, first shaft passing holes annularly and uniformly distributed around the hub are formed in a penetrating manner in an annular steel belt in a peripheral direction of the annular steel belt, one ends of the driving blade shafts extending out from a root end of a corresponding blade of the blades is fixedly connected with the blade seats, the other ends of the driving blade shafts extending out of a head end of the corresponding blade of the blades pass through the annular steel belt through a corresponding first shaft passing hole of the first shaft passing holes and are assembled with the annular steel belt in an autorotation manner, the annular steel belt is correspondingly connected with and penetrated through the driving blade shafts in a manner of surrounding the blades and the hub, the annular steel belt is fixedly connected to a shaft section of the turbine main shaft extending out from a top of the cone cap seat through an inhaul cable, the head end of the corresponding blade of the blades is fixedly provided with a blade baffle plate, the blade baffle plate is perpendicular to a plane tangential with a bottommost of an outwards protruded curve surface of the corresponding blade of the blades, and the blade baffle plate and an inwards recessed curve surface of the corresponding blade of the blades are in seamless contact fit;

wherein the fluted disc hold-down devices are mould weights with rollers.

2. The basic mechanism for converting fluid energy into mechanical energy according to claim 1, wherein the hub baseplate is provided with a first shaft hole in a penetrated manner, a shaft sleeve is installed on the first shaft hole, the shaft sleeve passes through the hub baseplate through the first shaft hole to be fixed to the hub baseplate, the shaft sleeve is fixedly sleeved over the turbine main shaft, and the turbine main shaft passes through the hub baseplate through the shaft sleeve and the first shaft hole to be fixedly connected to the hub baseplate through the shaft sleeve and the first shaft hole.

3. The basic mechanism for converting fluid energy into mechanical energy according to claim 1, wherein a round protective cover plate is assembled in the hub, a center position of the protective cover plate is provided with a second shaft passing hole in a penetrated manner, the built-in turbine shaft section is installed in a manner of passing through the protective cover plate through the second shaft passing hole, an inner peripheral surface of the second shaft passing hole and the built-in turbine shaft section are in radial clearance fit, and an outer peripheral surface of an outermost edge of the protective cover plate is spliced and fixed in a seamless manner with an inner peripheral surface of the through hole.

4. The basic mechanism for converting fluid energy into mechanical energy according to claim 1, wherein each of the blade seats is provided with installing holes, threaded fasteners are fastened on the installing holes through screw threads, and the blades are fixedly installed on the blade seats through the mutually fastened installing holes and threaded fasteners.

5. The basic mechanism for converting fluid energy into mechanical energy according to claim 1, wherein the blades consist of solid blades or hollow blades, an orthographic projection of each of the solid blades in a radial direction of a cylinder where the solid blade is located is in an isosceles trapezoid shape, an inwards recessed curve surface and an outwards protruded curve surface of the solid blade are in a cylinder surface shape, a cross section of the solid blade is correspondingly in an arc line segment shape, a geometric center of a circle where the inwards recessed curve surface is located is coincident with a geometric center of a circle where the outwards protruded curve surface is located, a radius of the circle where the inwards recessed curve surface is located is correspondingly smaller than a radius of the circle where the outwards protruded curve surface is located, a thickness of the cross section of the solid blade in each position is identical, the hollow blade consists of an inwards recessed curve surface blade and an outwards protruded curve surface blade, orthographic projections of the inwards recessed curve surface blade and the outwards protruded curve surface blade in a radial direction of a cylinder where the inwards recessed curve surface blade and the outwards protruded curve surface blade are located are respectively in the isosceles trapezoid shape, the inwards recessed curve surface blade and the outwards protruded curve surface blade are respectively in a cylinder surface shape, a cross section of the inwards recessed curve surface blade and a cross section of the outwards protruded curve surface blade are respectively and correspondingly in an arc line segment shape, radii of circles where the inwards recessed curve surface blade and the outwards protruded curve surface blade are located are different, geometric centers are mutually staggered along a cylinder shaft where the blades are located, symmetrical equal length edges of the inwards recessed curve surface blade and symmetrical isosceles edges of the outwards protruded curve surface blades are mutually attached and fixedly connected, so that a penetrating type gap penetrating the blades in a length direction of the hollow blade is formed between the inwards recessed curve surface blade and the outwards protruded curve surface blade, a cross section of the penetrating type gap is in a crescent shape, a thickness of the cross section of the penetrating type gap correspondingly and symmetrically decreases in a direction of leaving away from a center line, an orthographic projection of the corresponding blade of the blades in a radial direction of the cylinder where the blades are located is in the isosceles trapezoid shape, a width in a direction perpendicular to the radial direction of the hub continuously increases from the root end to the head end of the corresponding blade of the blades in a direction of leaving away from the hub, and the driving blade shafts extend in a length direction of the blades in a center of the penetrating type gap, and pass through the blades through the penetrating type gap to be assembled with the blades.

\* \* \* \* \*